(12) United States Patent
Newton

(10) Patent No.: US 7,363,938 B1
(45) Date of Patent: Apr. 29, 2008

(54) CONSTANT FLOW VALVE ASSEMBLY

(75) Inventor: John R. Newton, Vero Beach, FL (US)

(73) Assignee: Global Agricultural Technology and Engineering, LLC, Vero Beach, FL (US)

(*) Notice: Subject to any disclaimer, the term of this patent is extended or adjusted under 35 U.S.C. 154(b) by 279 days.

(21) Appl. No.: 11/358,771

(22) Filed: Feb. 21, 2006

Related U.S. Application Data

(60) Provisional application No. 60/664,299, filed on Mar. 22, 2005.

(51) Int. Cl.
G05D 16/08 (2006.01)
F16K 27/02 (2006.01)

(52) U.S. Cl. .............. 137/494; 137/315.05; 137/505; 137/505.41; 137/597

(58) Field of Classification Search ........... 137/492.5, 137/494, 495, 505, 505.12, 315.05, 597, 137/599.09, 505.39
See application file for complete search history.

(56) References Cited

U.S. PATENT DOCUMENTS

| | | | |
|---|---|---|---|
| 2,174,515 A | 10/1939 | Hughes | |
| 2,257,249 A * | 9/1941 | Thomas | 137/505.12 |
| 2,359,111 A * | 9/1944 | Hughes | 137/505.41 |
| 2,405,010 A * | 7/1946 | Bucknam | 137/495 |
| 2,639,194 A | 5/1953 | Wahlinr | |
| 2,746,471 A | 5/1956 | Cobb | |
| 2,960,109 A | 11/1960 | Wilson | |
| 3,229,714 A | 1/1966 | Raem | |
| 3,324,872 A * | 6/1967 | Cloud | 137/505.41 |
| 3,424,196 A | 1/1969 | Donner | |
| 3,557,831 A | 1/1971 | Katchka | |
| 3,643,685 A | 2/1972 | Hays | |
| 3,746,036 A | 7/1973 | Du Bois et al. | |
| 3,782,410 A | 1/1974 | Steuby | |
| 3,872,884 A | 3/1975 | Busdiecker et al. | |
| 3,943,969 A | 3/1976 | Rubin et al. | |
| 3,948,285 A | 4/1976 | Flynn | |
| 4,074,694 A | 2/1978 | Lee | |
| 4,080,993 A | 3/1978 | Lind, Jr. | |
| 4,083,380 A | 4/1978 | Huber | |
| 4,197,995 A | 4/1980 | Campbell et al. | |
| 4,250,915 A | 2/1981 | Rikuta | |
| 4,416,301 A | 11/1983 | Brumm | |
| 4,437,493 A | 3/1984 | Okuda et al. | |

(Continued)

FOREIGN PATENT DOCUMENTS

CA 530611 9/1956

(Continued)

Primary Examiner—Stephen M. Hepperle
(74) Attorney, Agent, or Firm—Gauthier & Connors LLP

(57) ABSTRACT

A dual valve assembly includes two regulating valves. Each valve includes an outer housing comprised of a cap joined to a base. The housing is internally subdivided by a barrier wall into a head section and a base section, the latter being further subdivided by a modulating assembly into a fluid chamber and a spring chamber. An inlet and a 90° outlet in the cap communicate with the fluid chamber. Fluid at a variable pressure is admitted into the fluid chamber via the inlet, with the modulating assembly serving to maintain the fluid exiting the fluid chamber via the outlet at a substantially constant pressure. A smaller one of the valves has its base nested within the spring chamber of the other larger valve.

3 Claims, 2 Drawing Sheets

U.S. PATENT DOCUMENTS

| | | | |
|---|---|---|---|
| 4,498,471 A * | 2/1985 | Kranz et al. | 128/204.26 |
| 4,508,140 A | 4/1985 | Harrison | |
| 4,513,777 A | 4/1985 | Wright | |
| 4,516,600 A | 5/1985 | Sturman et al. | |
| 4,621,658 A | 11/1986 | Buezis et al. | |
| 4,627,832 A | 12/1986 | Hooven et al. | |
| 4,630,642 A | 12/1986 | Detweiler | |
| 4,657,224 A | 4/1987 | Lattuada | |
| 4,682,622 A * | 7/1987 | Weber | 137/492.5 |
| 4,697,613 A | 10/1987 | Wienck | |
| 4,729,762 A | 3/1988 | Doumenis | |
| 4,796,660 A | 1/1989 | Bron | |
| 4,838,305 A | 6/1989 | Reinartz et al. | |
| 4,852,606 A | 8/1989 | Heneker | |
| 4,867,198 A | 9/1989 | Faust | |
| 5,137,522 A | 8/1992 | Bron | |
| 5,234,025 A | 8/1993 | Skoglund et al. | |
| 5,241,986 A | 9/1993 | Yie | |
| 5,255,711 A | 10/1993 | Reeds | |
| 5,303,734 A | 4/1994 | Eidsmore | |
| 5,341,968 A | 8/1994 | Vandoninck | |
| 5,383,489 A | 1/1995 | Golestan et al. | |
| 5,524,670 A | 6/1996 | Castle | |
| 5,529,090 A | 6/1996 | Golestan et al. | |
| 5,597,012 A | 1/1997 | Moinard | |
| 5,642,752 A | 7/1997 | Yokota et al. | |
| 5,727,529 A | 3/1998 | Tuckey | |
| 5,829,477 A | 11/1998 | Graham et al. | |
| 5,988,211 A | 11/1999 | Cornell | |
| 6,026,850 A | 2/2000 | Newton et al. | |

FOREIGN PATENT DOCUMENTS

| | | |
|---|---|---|
| DE | 37 06 579 A1 | 6/1988 |
| EP | 0 475 743 | 9/1991 |
| GB | 1 163 585 | 9/1969 |
| GB | 2006930 | 5/1979 |
| GB | 2 099 112 | 4/1982 |

* cited by examiner

CONSTANT FLOW VALVE ASSEMBLY

CROSS REFERENCE TO RELATED APPLICATION

This application claims priority from Provisional Patent application Ser. No. 60/664,299 filed Mar. 22, 2005.

BACKGROUND OF THE INVENTION

1. Field of the Invention

This invention relates to generally to fluid valves, and is concerned in particular with an assembly of regulating valves that are normally closed, that are opened by variable fluid pressures above selected threshold levels, and that when open, serve to deliver fluids at constant pressures and flow rates.

2. Description of the Prior Art

Regulating valves for the above-mentioned type are known, as disclosed for example in U.S. Pat. Nos. 6,026,850 and 6,209,578. While these known valves operate in an entirely satisfactory manner, for some uses, their design has proven to be overly complex, expensive, and difficult to incorporate in restricted spaces within fluid dispensing equipment, e.g., carbonated soft drink dispensers.

DETAILED DESCRIPTION OF PREFERRED EMBODIMENT

Figure 1:
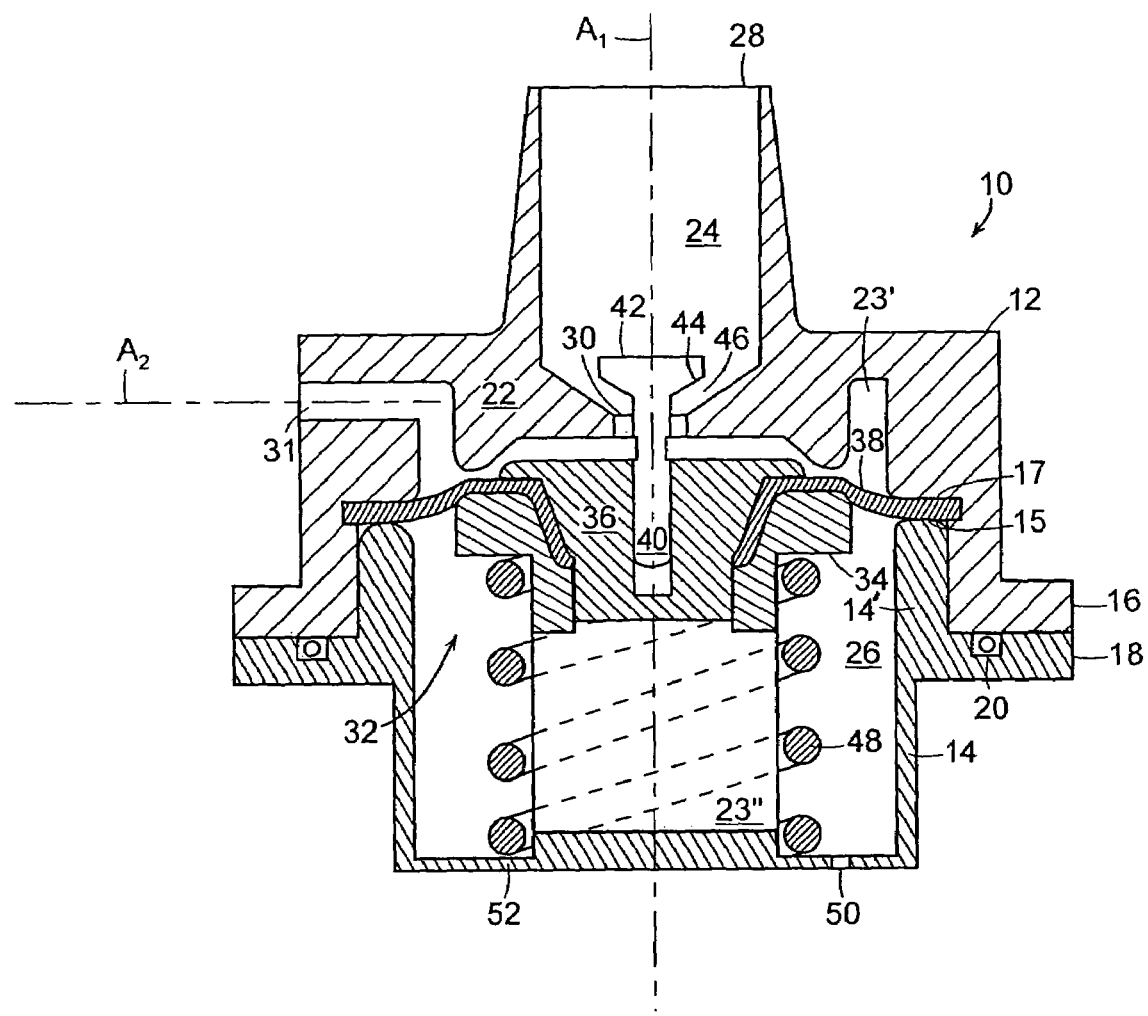
FIG. 1 is a sectional view through an individual regulating valve of the type included in the assembly of the present invention, the valve being shown in its open condition.

With reference initially to FIG. 1, a regulating valve of the type included in the combination of the present invention is generally depicted at 10. The valve includes an outer housing having a cap 12 joined to a cup-shaped base 14 at mating exterior flanges 16, 18, with an O-ring seal 20 interposed therebetween.

The housing is internally subdivided by a barrier wall 22 into a head section 24 and a base section 26. An inlet 28 is adapted to be connected to a fluid supply (not shown) having a pressure that can vary from below to above a threshold level. The inlet 28 and a central port 30 in the barrier wall 22 are aligned along a central axis $A_1$ of the valve. An outlet port 31 is aligned on a second axis $A_2$ transverse to the first axis $A_1$.

A modulating assembly 32 cooperates with the barrier wall 22 to subdivide the base section into a fluid chamber 23' segregated from a spring chamber 23". The modulating assembly serves to prevent fluid flow through the valve when the fluid pressure at the inlet 28 is below the threshold pressure. When the fluid pressure at the inlet exceeds the threshold pressure, the modulating assembly serves to accommodate fluid flow from the inlet section 24 through port 30 into chamber 23' at a constant pressure and flow rate, and from there through outlet port 31. Either the outlet port 31 or a downstream orifice or flow restrictor (not shown) serves to develop a back pressure in fluid chamber 23'.

The modulating assembly 32 includes a piston comprised of a hollow shell 34 and a central plug 36. The piston is supported for movement in opposite directions along axis $A_1$ by a flexible annular diaphragm 38. The inner periphery of the diaphragm is captured between the shell 34 and plug 36. The sup shaped base 14 has a cylindrical wall segment 14' received within the cap 12. The outer periphery of the diaphragm is captured between an upper rim 15 of the wall segment 14' and an inwardly projecting interior ledge 17 on the cap.

A stem 40 on the piston plug 36 projects through the port 30 into the head section 24. An enlarged head 42 on the stem has a tapered underside 44 that coacts with a tapered surface 46 of the barrier wall to modulate the size of the flow path through the port 30 as an inverse function of the varying fluid pressure in the input section, with the result being to deliver fluid to the outlet 31 at a constant pressure and flow rate.

A compression spring 48 is captured between an underside surface of shell 34 and the bottom wall 52 of the housing base 14. The spring urges the modulating assembly 32 towards the barrier wall 22. When the fluid pressure at the inlet 28 is below the threshold pressure, spring 48 serves to urge the diaphragm 38 against the barrier wall 22, thus preventing fluid flow from the fluid chamber 23' to the outlet 31. As the fluid pressure exceeds the threshold pressure, the resilient closure force of spring 48 is overcome, allowing the piston assembly to move away from the barrier wall, and allowing the modulating function of the coacting tapered surfaces 44, 46 to commence. An opening 50 in the bottom wall 52 serves to vent the volume beneath diaphragm 38 to the surrounding atmosphere.

Figure 2:
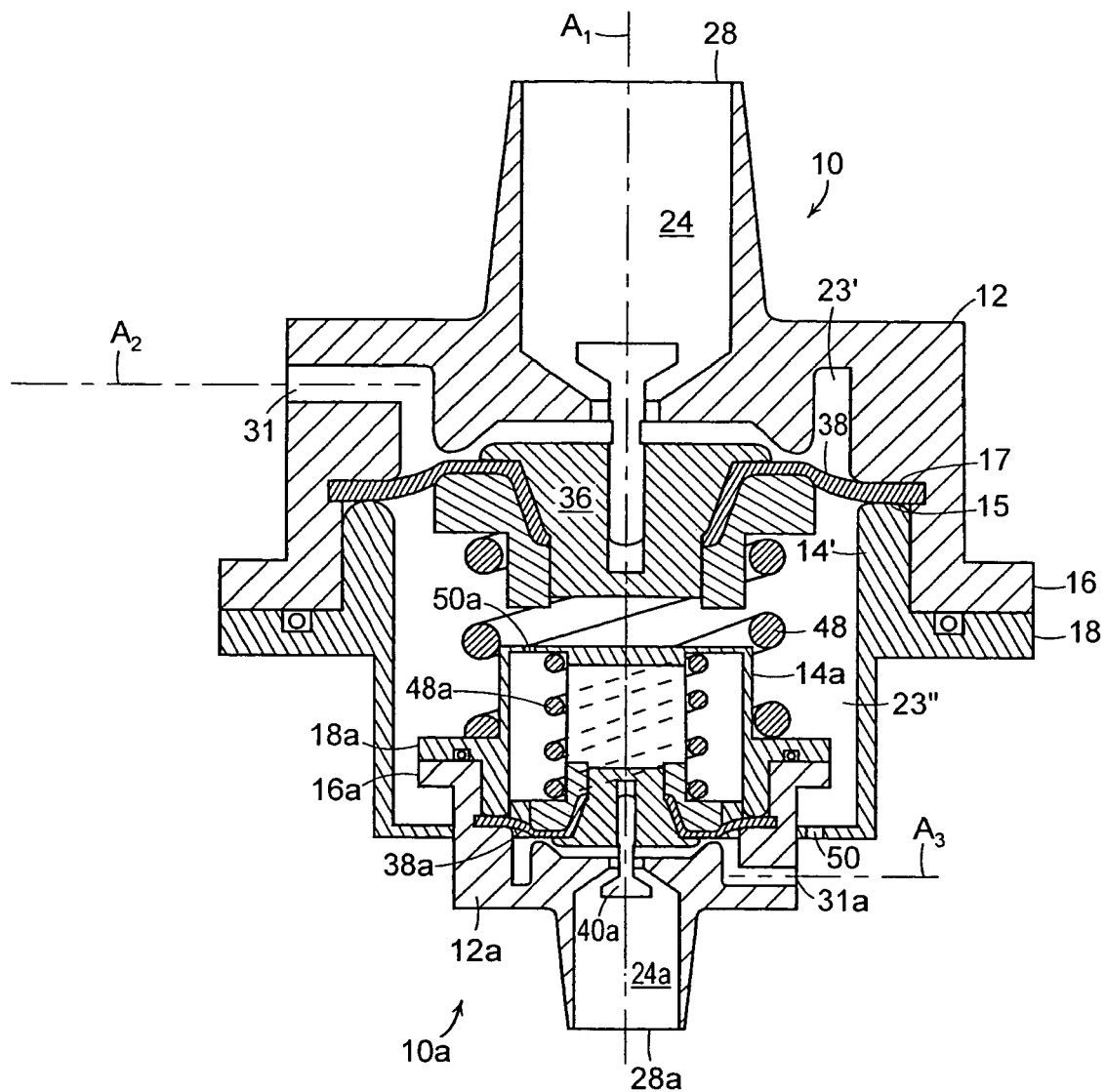
FIG. 2 is a sectional view showing an assembly in accordance with the present invention of two substantially identical but differently sized valves, both valves again being shown in the open condition.

In accordance with the present invention, and as shown in FIG. 2, a second valve 10a is inverted and telescopically received in the spring chamber 23" of the valve 10. Valve 10a is substantially identical to, although of smaller size than valve 10. The components of valve 10a have been identified by the same reference numerals, with the addition of an "a" modifier.

The two valves 10, 10a are combined in an axially compact assembly, with the base 14a of valve 10a serving as a guide post for the compression spring 48 of valve 10. The valve outlet 31a is aligned on a third axis $A_2$, which is also transverse to the common central axis $A_1$ of both valves 10, 10a.

The valve assembly of FIG. 2 is ideally suited for dispensing two different fluids to a remote mixing chamber. For example, in a soft drink dispenser, the valve 10 would control the flow of carbonated water, and the valve 10a would control the flow of flavored syrup.

I claim:

1. A valve assembly for receiving first and second fluids at variable pressures from first and second fluid sources and for delivering said fluids at substantially constant pressures to fluid applicators or the like, said valve assembly comprising:

A. a first valve comprising:
   a) an outer housing having a cap joined to a cup-shaped base;
   b) a barrier wall subdividing the interior of said housing into a head section and a base section;
   c) a modulating assembly subdividing said base section into a fluid chamber and a spring chamber;
   d) an inlet for connecting said input section to said first fluid source;
   e) a port in said barrier wall connecting said input section to said fluid chamber, said port being aligned with a central axis of said valve;

f) an outlet communicating with said fluid chamber, said outlet being aligned on a axis transverse to said central axis;
g) a stem projecting from said modulating assembly along said central axis through said port into said head section;
h) a flexible diaphragm supporting said modulating assembly within said housing for movement in opposite directions along said central axis;
i) a spring in said spring chamber, said spring being arranged to resiliently urge said modulating assembly into a closed position at which said diaphragm is in sealing contact with said barrier wall to thereby prevent fluid flow from said head section via said port and fluid chamber to said outlet, said spring acting in concert with said modulating assembly and the stem projecting there from to modulate the size of said port as an inverse function of the variable fluid pressure in said head section whereby the pressure of the first fluid delivered to said outlet is maintained at a substantially constant level, said valve being automatically actuated when the pressure of the fluid acting on said modulating assembly exceeds a threshold level, and being automatically closed when said pressure drops below said threshold level; and B. a second valve substantially identical in construction to but smaller in size than said first valve, the inlet of said second valve being adapted for connection to said second fluid source, and the outer housing of said second valve being received telescopically within the spring chamber of said first valve.

2. The valve assembly of claim 1 wherein the spring of said first valve is confined axially between the modulating assembly of said first valve and the outer housing of said second valve.

3. The valve assembly of claim 1 or 2 wherein said first and second valves are arranged coaxially, with one being inverted with respect to the other.

* * * * *